Patented Aug. 31, 1943

2,328,286

UNITED STATES PATENT OFFICE 2,328,286

PROCESS OF MAKING HEAVY MAGNESIUM OXIDE

Walter H. MacIntire, Knoxville, Tenn., assignor to American Zinc, Lead & Smelting Company, St. Louis, Mo., a corporation of Maine No Drawing. Application October 23, 1939, Serial No. 300,819

9 Claims. (Cl. 23—201)

This invention relates to the manufacture of a dense magnesium oxide and to a process for obtaining the same. Magnesium oxide has heretofore been prepared by suspending calcined dolomite in water, injecting carbon dioxide gas into the suspension, filtering the resultant solution of magnesium bicarbonate and heating the same to give the basic or hydrated magnesium carbonate, but on ignition of this separated carbonate a light magnesium oxide unsuited for many uses in the arts was obtained.

The object of the present invention is to produce a heavy magnesium oxide—one whose density is several times greater than that produced by the process just described.

According to the present invention I take selectively calcined dolomite produced by any well-known method in the art, though I prefer to produce it by the process defined in my U. S. Patent No. 1,953,419, wherein comminuted dolomite is selectively calcined under the influence of a current of steam to a composition substantially calcium carbonate and magnesium oxide. This selectively calcined dolomite properly cooled is suspended by agitation in an aqueous solution of magnesium sulfate or other magnesium salt, such as chloride or nitrate, though the sulfate is preferred. Preferably I suspend 100 pounds of the selectively calcined dolomite in approximately 1,550 pounds (range of 1,470 to 1,610) of the aqueous solution of magnesium sulfate. During agitation of this aqueous magnesium sulfate solution suspension I introduce a sufficient amount of carbon dioxide gas under pressure of three or more atmospheres to induce the successive steps of converting the magnesium oxide of the calcine into the hydroxide, carbonate and bicarbonate forms. This is accomplished without the application of heat and at a pressure of three or more atmospheres. The result is a solution practically devoid of calcium salts. Any undissolved calcium carbonate or other solid matter is then separated from the solution by filtration or any other suitable means, whereby there is obtained a separted magnesium sulfate solution of magnesium bicarbonate, and upon the application of heat to this solution sufficient to raise it to the boiling point, a deposit of heavy or dense magnesium carbonate of apparently normal composition is obtained. Preferably a current of steam is passed through the boiling solution to expedite precipitation of the magnesium bicarbonate. Ignition of this separated carbonate produces a magnesum oxide of great density—a density as high as 0.22 as compared with the magnesium oxide produced by the old method having a density of approximately .05.

Preferably the magnesium salt is employed in the proportion of about 10% by weight of the weight of water used, though the percentage of the salt may vary in practical operations from 5% to 15%. In fact it may be used to the extent of as high as 25%, but such increased percentage in the use of the magnesium salt almost invariably results in a decreaesd efficiency in the operation of the process. For general purposes the use of 10% of the magnesium salt to the weight of water employed will be found most desirable.

Having thus described my invention, what is claimed is:

1. The process which comprises suspending dolomite selectively calcined to a composition substantially calcium carbonate and magnesium oxide in an aqueous solution of magnesium sulfate, introducing sufficient carbon dioxide under pressure of three or more atmospheres to effect carbonation and dissolution of the magnesium oxide, separating undissolved calcium carbonate from the solution, heating the solution to boiling, separating the resulting precipitate of heavy magnesium carbonate from the solution, and then calcining the magnesium carbonate to produce heavy magnesium oxide.

2. The process which comprises suspending dolomite selectively calcined to a composition comprising substantially calcium carbonate and magnesium oxide in an aqueous solution of magnesium sulfate in the proportions of 100 pounds of the calcine to approximately 1,550 pounds of said solution, introducing carbondioxide gas under pressure of three or more atmospheres into the suspension at room temperature to effect carbonation and dissolution of the magnesium oxide, separating undissolved calcium carbonate from the solution, heating the solution to boiling, passing a current of steam through the solution, separating the resulting precipitate of heavy magnesium carbonate from the solution, and then calcining the magnesium carbonate to produce heavy magnesium oxide.

3. The process which comprises suspending dolomite selectively calcined to a composition of calcium carbonate and magnesium oxide in an aqueous solution of magnesium chloride in the proportions of 100 pounds of the calcine to approximately 1,550 pounds of said solution, introducing sufficient carbon dioxide gas under pressure of three or more atmospheres into the suspension at room temperature to effect carbonation and dissolution of the magnesium oxide, separating undissolved calcium carbonate from the solution, heating the solution to boiling, passing a current of steam through the solution, separating the resulting precipitate of heavy magnesium carbonate from the solution, and then calcining the magnesium carbonate to produce heavy magnesium oxide.

4. The process which comprises suspending dolomite selectively calcined to a composition of substantially calcium carbonate and magnesium oxide in an aqueous solution of magnesium nitrate in the proportions of 100 pounds of the calcine to approximately 1,550 pounds of said solution, introducing sufficient carbon dioxide gas under pressure of three or more atmospheres into the suspension at room temperature to effect carbonation and dissolution of the magnesium oxide, separating undissolved calcium carbonate from the solution, heating the solution to boiling, passing a current of steam through the solution, separating the resulting precipitate of heavy magnesium carbonate from the solution, and then calcining the magnesium carbonate to produce heavy magnesium oxide.

5. The process which comprises suspending dolomite, calcined selectively to a composition of substantially calcium carbonate and magnesium oxide, in an aqueous solution of a member of the group consisting of magnesium sulfate, magnesium chloride and magnesium nitrate, the concentration of magnesium salt in said solution being from 5% to 25%, introducing sufficient carbon dioxide gas under pressure of three or more atmospheres into and without heating the suspension to effect carbonation and dissolution of the magnesium oxide, separating undissolved calcium carbonate from the solution, heating the solution to boiling, separating the resulting precipitate of heavy magnesium carbonate from the solution, and then calcining the magnesium carbonate to produce heavy magnesium oxide.

6. The process which comprises suspending dolomite, calcined selectively to a composition of substantially calcium carbonate and magnesium oxide, in an aqueous solution of a member of the group consisting of magnesium sulfate, magnesium chloride, and magnesium nitrate, the concentration of magnesium salt in said solution being from 5% to 25% and the calcine being added in the proportions of 100 pounds to approximately 1,550 pounds of said solution, introducing sufficient carbon dioxide gas under pressure of three or more atmospheres into and without heating the suspension to effect carbonation and dissolution of the magnesium oxide, separating undissolved calcium carbonate from the solution, heating the solution to boiling, separating the resulting precipitate of heavy magnesium carbonate from the solution, and then calcining the magnesium carbonate to produce heavy magnesium oxide.

7. The process which comprises preparing an aqueous solution of a magnesium salt in the proportions of from 5% to 25% by weight of the salt to the weight of the water, said salt being a member of the group consisting of magnesium sulfate, magnesium chloride, and magnesium nitrate, suspending dolomite selectively calcined to a composition of substantially calcium carbonate and magnesium oxide therein, introducing sufficient carbon dioxide gas under pressure of three or more atmospheres into and without heating said suspension to effect carbonation and dissolution of the magnesium oxide, separating undissolved calcium carbonate from the solution, heating the solution to boiling, passing a current of steam through the solution, separating the resulting precipitate of heavy magnesium carbonate from the solution, and then calcining the magnesium carbonate to produce heavy magnesium oxide.

8. The process which comprises suspending dolomite, selectively calcined to a composition of substantially calcium carbonate and magnesium oxide, in an aqueous solution of magnesium chloride, introducing sufficient carbon dioxide under pressure of three or more atmospheres into and without heating the suspension to effect carbonation and dissolution of the magnesium oxide, separating undissolved calcium carbonate from the solution, heating the solution to boiling, separating the resulting precipitate of heavy magnesium carbonate from the solution, and then calcining the magnesium carbonate to produce heavy magnesium oxide.

9. The process which comprises suspending dolomite, selectively calcined to a composition of substantially calcium carbonate and magnesium oxide, in an aqueous solution of magnesium nitrate, introducing sufficient carbon dioxide under pressure of three or more atmospheres into and without heating the suspension to effect carbonation and dissolution of the magnesium oxide, separating undissolved calcium carbonate from the solution, heating the solution to boiling, separating the resulting precipitate of heavy magnesium carbonate from the solution, and then calcining the magnesium carbonate to produce heavy magnesium oxide.

WALTER H. MacINTIRE.